(12) United States Patent
Furuya et al.

(10) Patent No.: US 6,426,738 B1
(45) Date of Patent: Jul. 30, 2002

(54) SWITCH STRUCTURE FOR DISPLAY SCREEN

(75) Inventors: Yoshiyuki Furuya; Takeyuki Amari, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/471,110

(22) Filed: Dec. 23, 1999

(30) Foreign Application Priority Data

Dec. 25, 1998 (JP) ............................................ 10-371601

(51) Int. Cl.⁷ .............................. G09G 3/00; G09G 5/00
(52) U.S. Cl. ......................... 345/156; 345/184; 345/32
(58) Field of Search ................................ 345/156–160, 345/166, 170–172

(56) References Cited

U.S. PATENT DOCUMENTS

| | | | | |
|---|---|---|---|---|
| 5,627,532 A | * | 5/1997 | Ishiguro | 341/23 |
| 5,982,355 A | * | 11/1999 | Jaeger et al. | 345/161 |
| 6,020,945 A | * | 2/2000 | Sawai et al. | 349/119 |
| 6,140,987 A | * | 10/2000 | Stein et al. | 345/87 |
| 6,232,947 B1 | * | 5/2001 | Miyawaki et al. | 345/99 |
| 6,275,217 B1 | * | 8/2001 | Jaeger et al. | 345/172 |

* cited by examiner

Primary Examiner—Kent Chang
Assistant Examiner—Ralph L. Taylor
(74) Attorney, Agent, or Firm—Sughrue Mion, PLLC (57) ABSTRACT

A switch structure for a display screen includes a liquid-crystal display (16) that includes a display screen (16a) and is capable of displaying on the display screen (16a) an image that indicates various information comprising switch information, and a switch portion (20) disposed above the liquid-crystal display (16). The switch portion (20) includes a switch body (22) disposed on the liquid-crystal display (16), the switch body (22) being operative to be switched in one of an on state and an off state thereof, and a operation plate (23) disposed above the display screen (16a) of the liquid-crystal display (16), wherein when the operation plate (23) is depressed, the state of the switch body (22) is switched. The operation plate (23) includes an optical portion (24) through which an image indicating the switch information on the display screen (16a) is transmitted. The optical portion (24) forms the transmitted image to enlarge a visible range with which the image is made to be visible. It is preferable that the optical portion (24) of the operation plate has a concave lens.

10 Claims, 11 Drawing Sheets

ANGLE OF VIEW (RIGHT AND LEFT 45° *2 UPWARD 45° DOWNWARD 10°)

FIG. 17

SWITCH STRUCTURE FOR DISPLAY SCREEN

BACKGROUND OF THE INVENTION

1. Field of the Invention

The present invention relates to a switch structure for a display screen, arranged to display an image indicating switch information on a display screen, and including a switch portion which is operated above the display screen.

The present application is based on Japanese Patent Application No. Hei. 10-371601, which is incorporated herein by reference.

2. Description of the Related Art

In recent years an attempt has been made to realize a switch having a multiplicity of functions. Therefore, a switch for a display screen has been suggested which displays an image indicating switch information displayed on the display screen of the display unit and which is operated above the display screen. The switch for the display screen includes a touch-panel-type switch in which a touch panel is disposed on the display screen and arranged to be depressed, and a contact-type switch in which a transparent operation member is provided for the display screen and arranged to be depressed to operate the switch. The touch panel switch has substantially no operation stroke when the depression is performed. Therefore, a satisfactory input feeling cannot be obtained. On the other hand, the switch structure including the transparent operation members and the contact-type switches permits a sufficiently long operation stroke when the depression is performed. Therefore, the foregoing problem can be overcome and a satisfactory input operability can be obtained.

Figure 16:
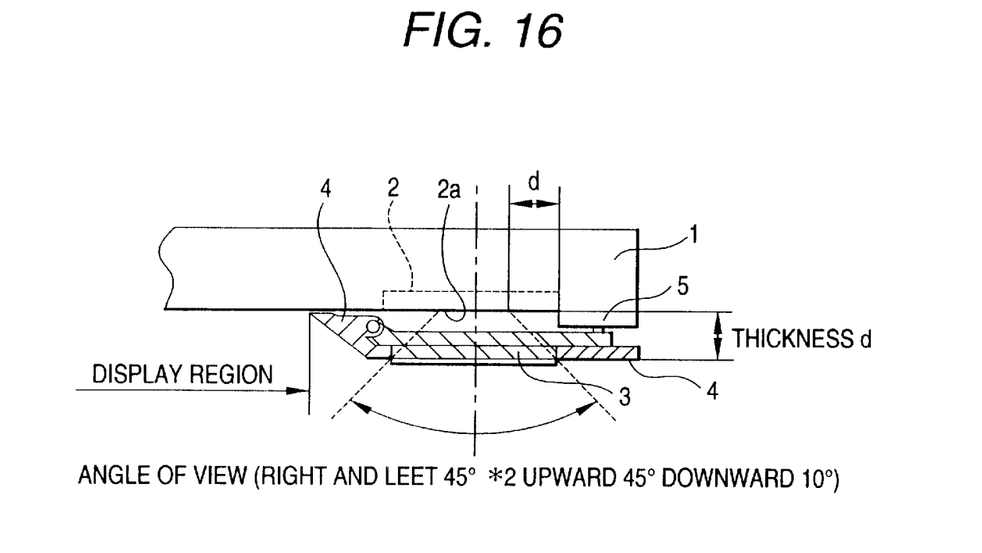
FIGS. 16 and 17 illustrate an example of a known display screen.
Figure 17:
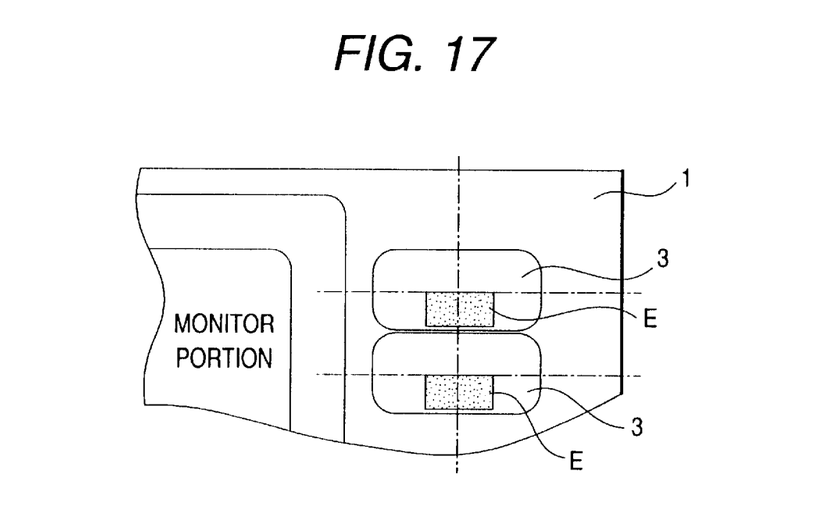

An example of a switch structure for a display screen of the foregoing type is shown in FIGS. 16 and 17. Referring to FIGS. 16 and 17, a body 1 of the apparatus is provided with a display 2 for displaying an image indicating switch information. Transparent operation members 3 are disposed above a display screen 2a of the display 2 for displaying an image indicating switch information. An end of each of the transparent operation members 3 is rotatively supported by a display panel 4. A switch portion 5 is disposed between another end of each of the transparent operation members 3 and the body 1 of the apparatus. The image of the switch information displayed on the display 2 is transmitted through and also displayed on the surface side of the transparent operation member 3. Thus, a user recognizes the switch information, and then depresses the transparent operation member 3.

The above-mentioned switch structure for a display screen, however, has the thickness d from the display screen 2a of the display 2 to the surface of the transparent operation member 3. Therefore, when the user views the image of the switch information on the display 2 from a diagonal position, a dead area is produced on the display screen 2a, as shown in FIG. 16. The dead area is enlarged according to the angle of visibility. Therefore, when an attempt is made to maintain a wide angle of visibility of 45° in each of right and left directions, 45° in an upward direction and 10° in a downward direction, the effective display area of the display 2 is made to be small area E indicated in faint black shown in FIG. 17. Therefore, there arises a problem in that the display area of the display 2 cannot effectively be used.

In order to effectively use the display area of the display 2, substantially the overall display area of the display 2 must be used as the effective display area. In order to maintain a required wide angle of visibility, the opened area of the transparent operation member 3 must considerably be enlarged. In the foregoing case, the transparent operation members 3 are excessively enlarged from a viewpoint of practical use.

If optical paths are formed in such a manner that light made incident on the transparent operation member 3 passes toward each end surface of the transparent operation members 3, another problem arises in that a ghost occurs according to the angle of viewing.

SUMMARY OF THE INVENTION

In view of the foregoing, it is an object of the present invention to provide a switch structure for a display screen, which is capable of maintaining a wide angle of visibility, permitting the display area of a display device to be used effectively and preventing occurrence of a ghost.

According to the first aspect of the present invention, there is provided a switch structure for a display screen which comprises a display device that includes a display screen and is capable of displaying on the display screen an image that indicates various information comprising switch information, a switch body disposed on the display device, the switch body being operative to be switched in one of an on state and an off state thereof, and a operation plate disposed above the display screen of the display device, wherein when the operation plate is depressed, the state of the switch body is switched, the operation plate including an optical portion through which an image indicating the switch information on the display screen is transmitted, the optical portion forming the transmitted image to enlarge a visible range with which the image is made to be visible. Accordingly, when an image of switch information is viewed from a right position or a left position, the dead area of the display screen can be reduced which is caused from the thickness from the display screen of the display device to the surface of the operation plate. Therefore, the ratio of the effective display area of the display device with respect to the opened area of the operation plate can be raised. As a result, a wide angle of visibility can be maintained and the display area of the display device can effectively be used.

According to the second aspect of the present invention, it is preferable that the optical portion of the operation plate has a concave lens. The foregoing switch structure is able to simplify the structure of the optical portion, in addition to the effect obtainable from the first aspect. Therefore, manufacturing and assembly can easily be performed.

According to the third aspect of the present invention, it is preferable that the operation plate further includes a switch depressing portion formed on one end of the optical portion, the switch depressing portion being disposed above the switch body, and a pivotally supporting portion provided adjacent to the other end of the optical portion, wherein the optical portion is pivotally supported by the pivotally supporting portion, and wherein when the optical portion is depressed, the state of the switch body is switched by the switch depressing portion. The foregoing switch structure has the structure that when the optical portion is depressed, the operation member is rotated relative to the pivotally supporting portion so that the switch depressing portion operates the switch body, in addition to the effect obtainable from the first aspect or the second aspect.

According to a fourth aspect of the present invention, it is preferable that the concave lens has a flat surface on one side thereof and a concave shape on an opposite side thereof facing the display screen. The foregoing switch structure facilitates the depressing operation because the side which is depressed by the finger is formed into the flat surface, in addition to the effect obtainable from the second aspect.

According to a fifth aspect of the present invention, it is preferable that the concave lens has a concave shape on one side thereof and also a concave shape on an opposite side thereof facing the display screen. The foregoing switch structure has the structure that the dead area on the display screen caused from the thickness from the display screen of the display unit to the surface of the operation member can furthermore be reduced and, therefore, the ratio of the effective display area of the display with respect to the opened area of the operation member can furthermore be raised in addition the effect obtainable from the second aspect. As a result, a wide angle of visibility can be maintained and the display area of the display device can furthermore effectively be used.

According to a sixth aspect of the present invention, it is preferable that the concave lens has a convex shape on one side thereof and a concave shape on an opposite side thereof facing the display screen. The foregoing switch structure facilitates correction of the lens aberration of the optical portion, in addition to the effect obtainable from the second aspect.

According to a seventh aspect of the present invention, it is preferable that the operation plate has a structure that only the optical portion is formed of a transparent member, and the switch depressing portion and the pivotally supporting portion are formed of a light absorbing member. The foregoing switch structure has the structure that light beams among light beams made incident on the optical portion which pass through optical paths formed toward the switch depressing portion, the rotatively support member and the operation member are not reflected by the end surfaces, in addition to the effect obtainable from the first aspect. Therefore, occurrence of any ghost can be prevented.

According to an eighth aspect of the present invention, it is preferable that the optical portion is provided with a non-reflection portion for preventing reflection of incident light, the non-reflection portion facing the display screen. The foregoing switch structure for a display screen has the structure that light made incident on the optical portion are not reflected by the surface of the optical portion adjacent to the display screen, in addition to the effects obtainable from the first to seventh aspect. Therefore, lowering of contrast can be prevented and, therefore, the display quality can be improved in addition to the effects obtainable from the first to seventh aspects.

According to a ninth aspect of the present invention, it is preferable that the optical portion has a surface provided with a smoke layer. The foregoing switch structure has the structure that the contrast can be raised when electric portion has been supplied to the display device and a smoke effect can be obtained to improve the appearance of the display screen of the display device when supply of electric power to the display device is inhibited, in addition to the effect obtainable from the first to eighth aspects.

According to a tenth aspect of the present invention, it is preferable that the switch structure according to any one of the first to ninth aspects further comprises a switch portion that includes the switch body and the operation plate, wherein the display screen of the display device has a switch-information display area on which the image indicating the switch information is displayed and the other-information display area on which the other information is displayed, so that at least two kinds of information are displayed on the display screen, and the switch portion is disposed above the switch-information display area of the display screen. The foregoing switch structure for a display screen has the structure that a portion of the display screen of the display device is assigned to switch information and switch information is combined with the switch portion so that the single display device has both of a switch information display function and another-information display function, in addition to the effect obtainable from the first to ninth aspects. Therefore, the necessity of mounting two display device can be eliminated. Thus, the overall size of the apparatus and its cost can be reduced.

Other objects, features and advantages of the present invention will be evident from the following detailed description of the preferred embodiments described in conjunction with the attached drawings.

DETAILED DESCRIPTION OF THE PREFERRED EMBODIMENTS

Embodiments of the present invention will now be described with reference to the drawings.

Figure 1:
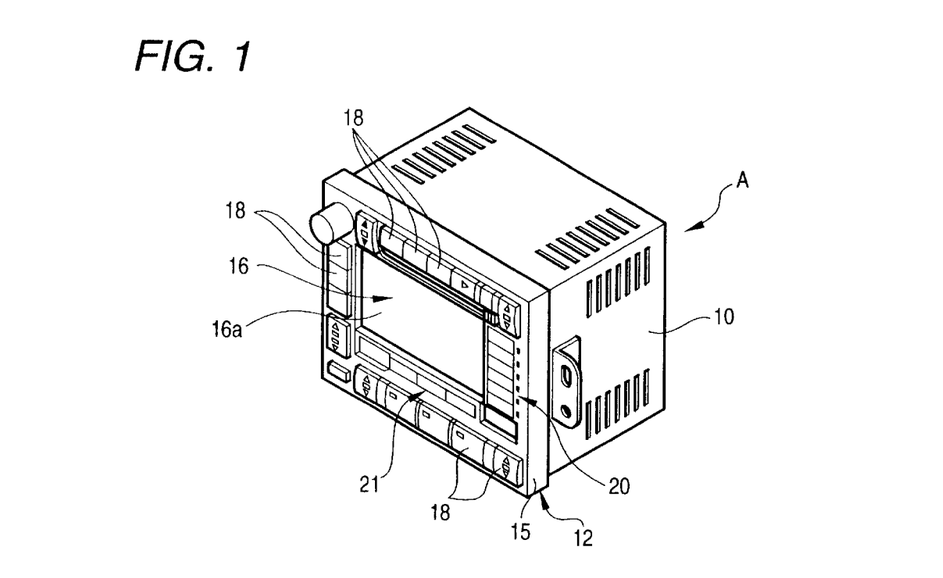
FIG. 1 is a perspective view showing an electric apparatus for a vehicle according to a first embodiment of the present invention.
Figure 2:
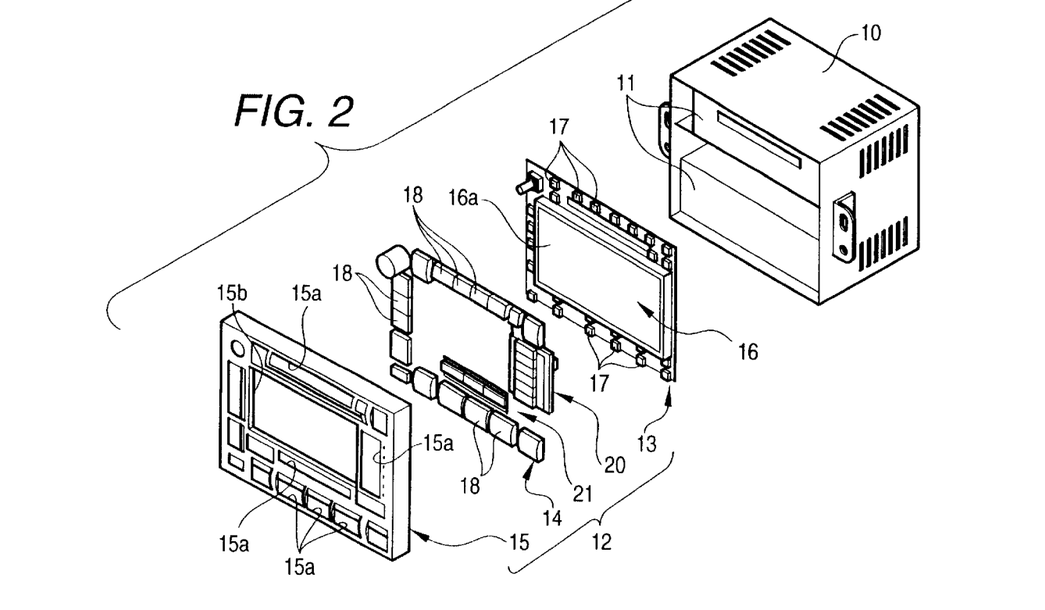
FIG. 2 is an exploded perspective view showing the electric apparatus for a vehicle according to the first embodiment of the present invention.
Figure 3:
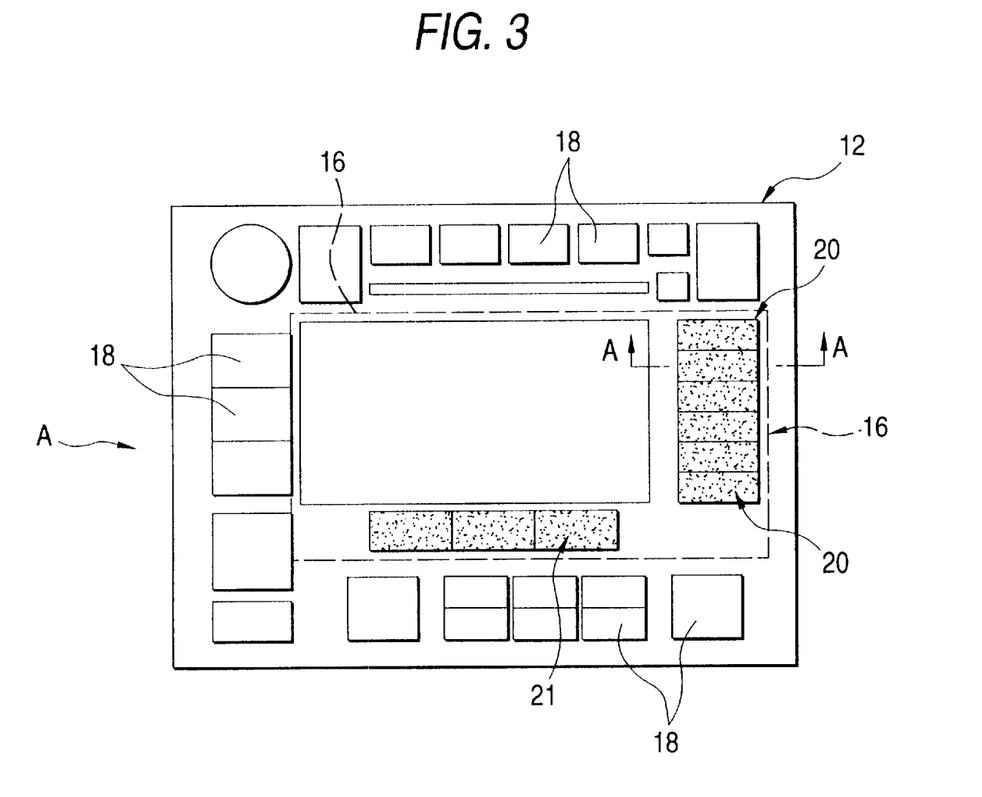
FIG. 3 is a front view showing the electric apparatus for a vehicle according to the first embodiment of the present invention.

FIGS. 1 to 5 show a first embodiment of the present invention. In the first embodiment, the present invention is applied to a switch structure for a display screen for an electric device A for a vehicle. FIG. 1 is a perspective view showing the electric device A for a vehicle. FIG. 2 is an exploded view showing the electric device A for a vehicle. FIG. 3 is a front view showing the electric device A for a vehicle. FIG. 4(a) is a cross sectional view taken along line A—A shown in FIG. 3. FIGS. 4(b) and 4(c) are diagrams showing the principle of the present invention. FIGS. 5(a) and 5(b) are diagrams showing the principle of the present invention.

Referring to FIGS. 1 to 5, the electric device A for a vehicle comprises a sheet-metal case 10 having an opened front surface and accommodating apparatuses 11, such as CD or cassettes. An operation panel 12 is secured to the front surface of the sheet-metal case 10. The operation panel 12 includes a switch board 13, a switching member 14, switch portions 20 and 21 and a face cover 15. The foregoing elements of the operation panel 12 are laminated.

A liquid-crystal display 16, which is a display device, is provided on a surface side of the switch board 13. A multiplicity of switch bodies 17 are disposed around the liquid-crystal display 16. The display screen of the liquid-crystal display 16 is sectioned into a switch-information display area for displaying an image indicating switch information and the other-information display area for displaying an image indicating the other information. Thus, one display screen displays two kinds of information.

The switching member 14 is provided with switch operation portions 18 at positions corresponding to the plural switch bodies 17. When, for example, the switch operation portion 18 is depressed, each of the switch bodies 17 is operated. The structures of the switch portions 20 and 21 will be described later.

The face cover 15 has openings 15a for the switches formed at positions corresponding to the switch operation portions 18. The openings 15a for the switches permit exposure of the switch operation portions 18. Moreover, the face cover 15 has opening 15b for the display formed at the position corresponding to the other-information display area of the liquid-crystal display 16. In addition, the switch portions 20 and 21 are formed on the display screen 16a corresponding to the switch information area of the liquid-crystal display 16. The liquid-crystal display 16 and the switch portions 20 and 21 form the switch structure for a display screen.

Figure 4A:
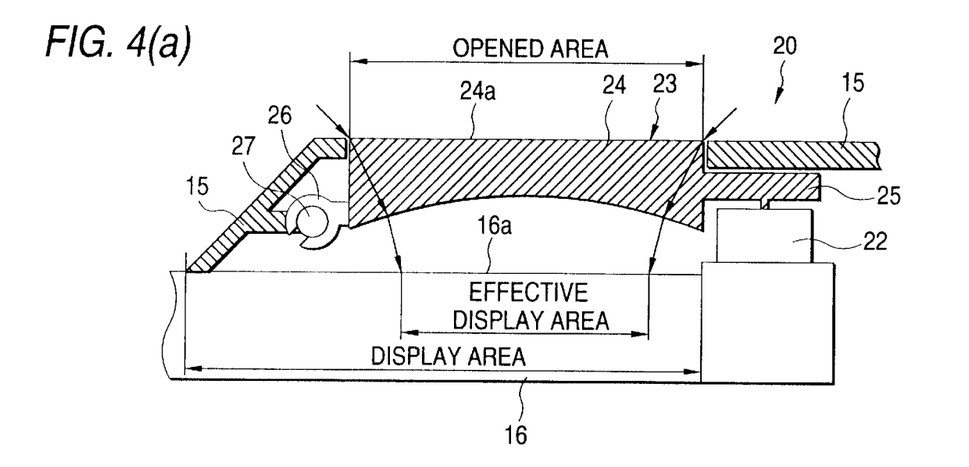
FIG. 4(a) is a cross sectional view taken along line A—A shown in FIG. 3.
Figure 4B:
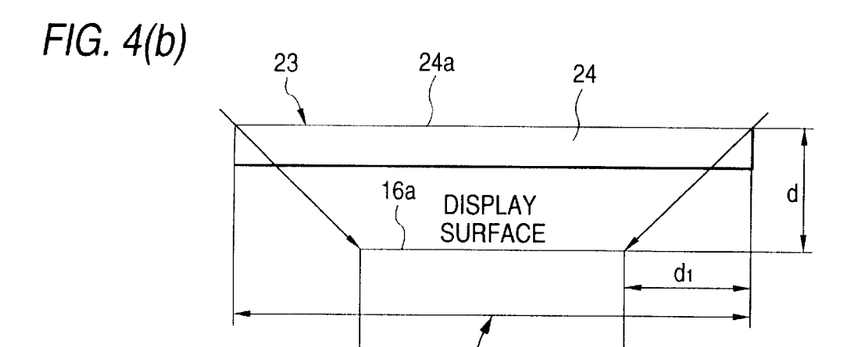
FIGS. 4(b) and (c) are diagrams showing the principle of the present invention.
Figure 4C:
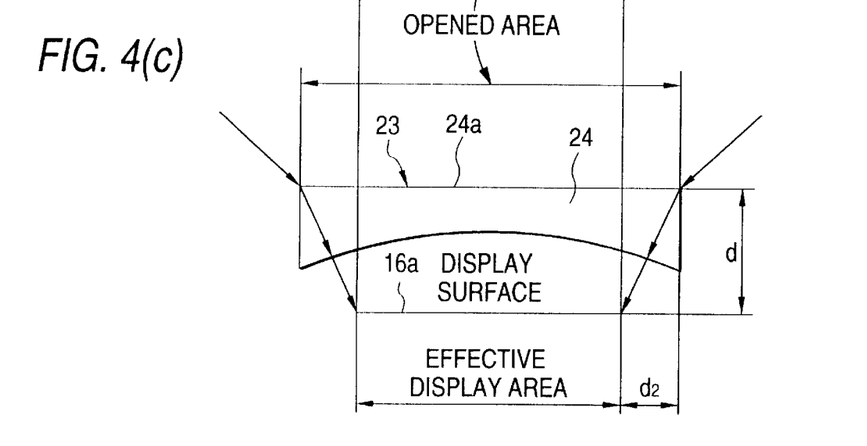

As shown in FIGS. 4(a) to (c), the switch portion 20 includes a switch body 22 disposed adjacent to the display screen 16a of the liquid-crystal display 16 and arranged to be switched on/off and a transparent operation plate 23 disposed above the display screen 16a to transmit and display, on the surface thereof, the image indicating switch information displayed on the liquid-crystal display 16.

The transparent operation plate 23 includes an optical portion 24 having a light transmissive member and forming an image of the display screen 16a in such a manner that the visible range with which an image of switch information is made to be visible, a switch depressing portion 25 provided to an end of the optical portion 24 and disposed above the switch body 22 and a pivotally supporting portion 26 provided for another end of the optical portion 24. The pivotally supporting portion 26 is supported by a support point 27 of the face cover 15 to rotatively support the optical portion 24 and the switch depressing portion 25 relative to the pivotally supporting portion 26.

In the first embodiment, the optical portion 24 includes a concave lens having a flat surface on the surface side 24a thereof and a concave shape on the other side (the reverse side) thereof facing the display screen 16a. The surface side 24a of the optical portion 24 is exposed from the openings 15a for the switches of the face cover 15. The overall portion of the surface side 24a of the optical portion 24 is an opened area of the following transparent operation plate 23.

The switch depressing portion 25 has a rod portion (having no reference numeral) which is allowed to downward project, a lower leading end of the rod portion being inserted into the switch body 22. The face cover 15 is disposed above the upper surface of the switch depressing portion 25. Thus, separation of the transparent operation plate 23 from the face cover 15 can be prevented.

Also each of the other switch portions 21 is structured similarly to the switch portion 20.

Since the structure is formed as describe above, the image of switch information is displayed on the display screen 16a of the liquid-crystal display 16 correspondingly to each transparent operation plate 23. The images indicating a plurality of switch information displayed on the display screen 16a are transmitted through and displayed on the surface side of the optical portion 24 of the plural transparent operation plates 23. Then, the user views the display, and then the user depresses the optical portion 24 of a required transparent operation plate 23. Thus, the transparent operation plate 23 is displaced downwards so that the switch depressing portion 25 depresses the switch body 22. As a result, the switch body 22 is operated.

Figure 5A:
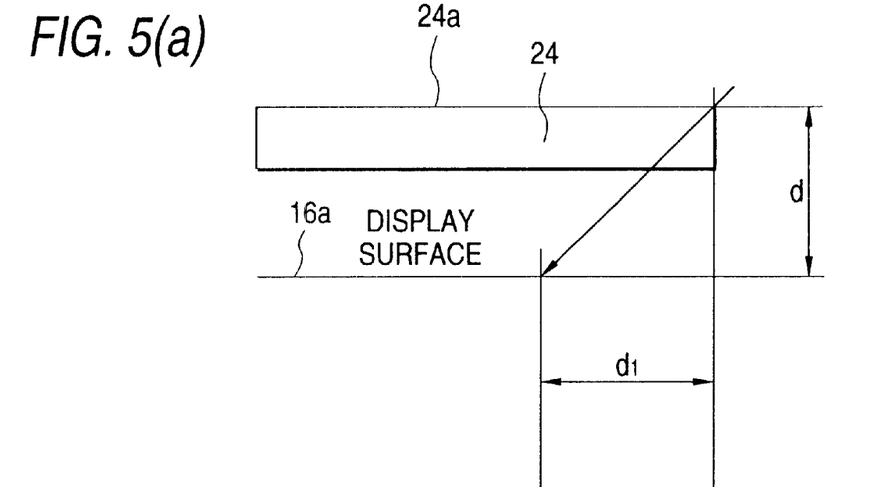
FIGS. 5(a) and 5(b) are diagrams showing the principle of the present invention.

During the above-mentioned operation, the image of switch information on the display screen 16a which is viewed through the optical portion 24 of the transparent operation plate 23 by the user will now be described. As shown in FIGS. 4(b) and 5(a), a case will now be considered in which both of the other side facing the display screen and the surface side of the transparent operation plate 23 are formed into flat surfaces and, therefore, no lens function is imparted. In the foregoing case, visual recognition of the image of switch information on the liquid-crystal display 16 from a right or left position which is performed by a user encounters a dead area having large width d1 with respect to thickness d from the display screen 16a of the liquid-crystal display 16 to the surface side 24a of the optical portion 24 and produced on the display screen 16a.

Figure 5B:
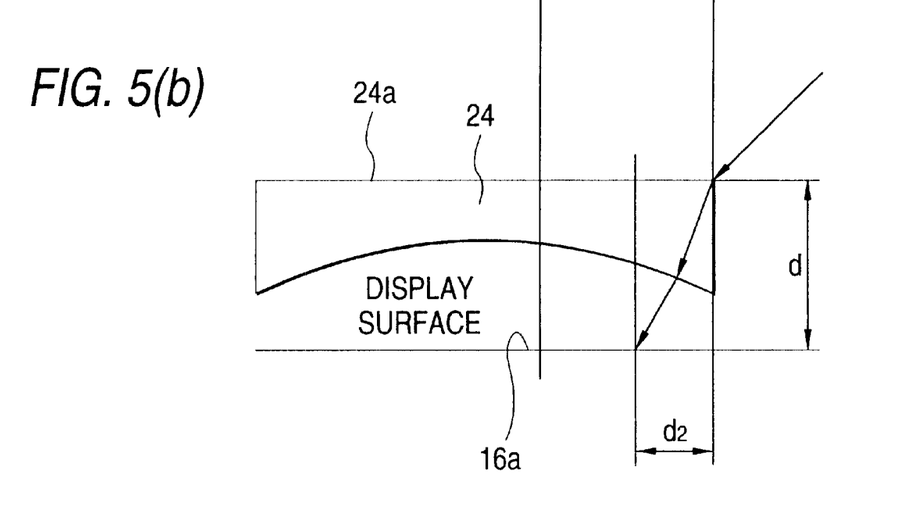

On the other hand, the first embodiment structured as shown in FIGS. 4(c) and 5(b) has the structure that the optical portion 24 has the lens function. In the foregoing case, the refraction of incident light causes the image of the display screen to be formed in such a manner that the visible range in which the image of switch information is made to be visible is enlarged. Therefore, only a small dead area having a small width d1 is formed on the display screen 16a with respect to the thickness d from the display screen 16a of the liquid-crystal display 16 to the surface side 24a of the transparent operation plate 23. As compared with the structure shown in FIGS. 4(b) and 5(a), the first embodiment shown in FIGS. 4(c) and 5(b) enables the ratio of the effective display area of the liquid crystal display with respect to the opened area of the transparent operation plate 23 to be raised. As a result, a larger angle of visibility can be maintained. Moreover, the display area of the liquid-crystal display 16 can effectively be used.

When the structure formed as shown in FIG. 4(b) and having no lens function and the structure formed as shown in (c) and having the lens function are attempted to realize the same effective display area, the structure formed as shown in FIG. 4(b) and having no lens function must have a large area of opening. On the other hand, the structure formed as shown in FIG. 4(c) and having the lens function requires only a small area of opening. Therefore, when a switch structure for a display screen having a required effective display area is manufactured, the present invention enables the size of the optical portion 24 to be reduced. As a result, the size of the switch structure for a display screen can be reduced.

The first embodiment has the structure that the optical portion 24 includes the concave lens. Therefore, the structure of the optical portion 24 can be simplified. Therefore, production and assembly can easily be performed and the cost can be reduced. The concave lens has the flat surface on the surface side 24a and the concave shape on the other side facing the display screen 16a. Therefore, the side which is depressed by the finger of the user is formed into the flat surface. Therefore, the depressing operation can easily be performed and, therefore, the operability can be improved.

The first embodiment has the structure that a portion of the display screen 16a of the liquid-crystal display 16 is assigned to the image of switch information. Moreover, switch is combined with the switch portions 20 and 21. Therefor, the single liquid-crystal display 16 have both of the function for displaying switch and the function of displaying the other information. Therefore, a necessity or providing two liquid crystal displays can be eliminated. As a result, the overall size of the apparatus and the cost of the same can be reduced.

Second to tenth embodiments of the present invention will now be described. Similarly to the first embodiment, the second to tenth embodiments have the structure that the present invention is applied to the switch structure for a display screen for the electric device A for a vehicle. The same elements as those according to the first embodiment are given the same reference numerals and the same elements are omitted from description. Therefore, only different elements will now be described.

Figure 6A:
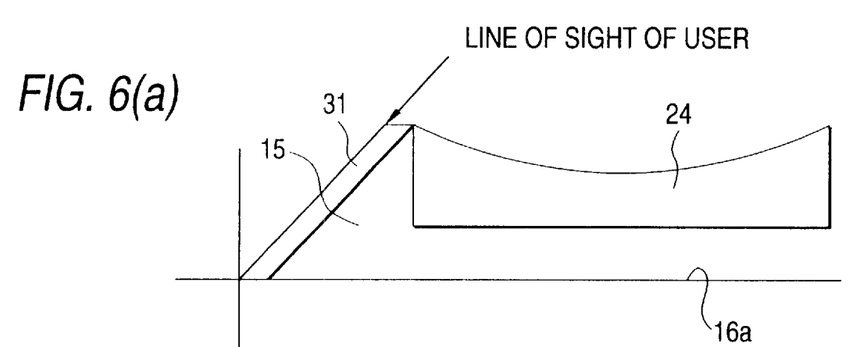
FIG. 6(a) is a diagram showing the structures of an optical portion 24 and so forth according to a second embodiment of the present invention and FIG. 6(b) is a diagram showing the structures of an optical portion 24 and so forth according to a third embodiment of the present invention.
Figure 7A:
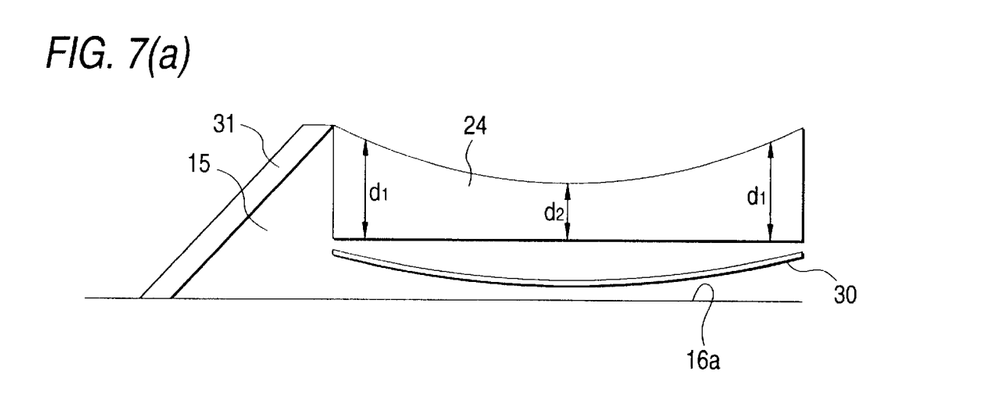
FIG. 7(a) shows an image 30 of a display screen 16a according to the second embodiment of the present invention which can be viewed from a user and FIG. 7(b) shows an image 30 of a display screen 16a according to the third embodiment of the present invention which can be viewed from a user.

FIG. 6(a) is a diagram showing the structure of the optical portion 24 and so forth according to the second embodiment. FIG. 7(a) is a diagram showing an image 30 of the display screen 16a which can be viewed by the optical portion 24. Referring to FIGS. 6(a) and 7(a), the second embodiment has the structure that the optical portion 24 includes a concave lens having a concave shape on the surface side 24a thereof and a flat surface on the other side facing the display screen 16a. The concave lens is made of a material, such as acrylic resin, having a high refractive index. The thickness of the concave lens is determined such that the thickness of the central portion is d2 and the thickness of the peripheral portion is d1 which is larger than d2 (d1>d2).

According to the second embodiment, when light passes through the material having the high refractive index, the length of the optical path is made to be 1/n owing to change in the refractive index. Therefore, the optical portion 24 causes the display surface to be deformed bilaterally symmetrical. As a result, the image 30 of the display screen as shown in FIG. 7(a) is formed.

Figure 6B:
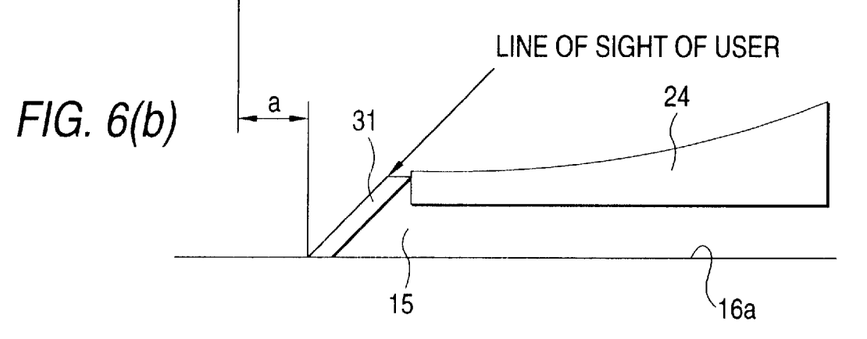
Figure 7B:
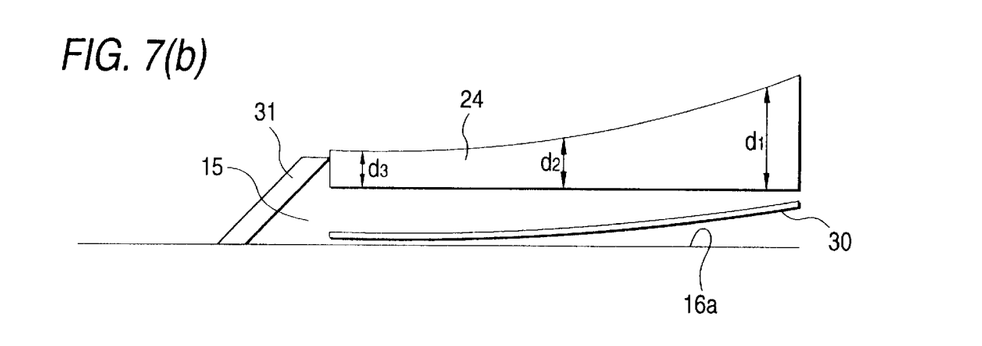

FIG. 6(b) is a diagram showing the structure of the optical portion 24 and so forth according to a third embodiment of the present invention. FIG. 7(b) is a diagram showing the image 30 of the display screen 16a which can be viewed by the optical portion 24. Referring to FIGS. 6(b) and 7(b), the third embodiment has the structure similar to that according to the second embodiment. That is, the optical portion 24 includes a concave lens having a concave shape on the surface side 24a of the optical portion 24 and a flat surface on the other side facing the display screen 16a. The concave lens is made of a material, such as acrylic resin, having a high refractive index. The third embodiment is different from the second embodiment in that the thickness of the concave lens is determined such that the thickness of the central portion is d2 and the thickness of the left-hand end is d3 (d3<d2) which is smaller than d2. Moreover, the thickness of the right-hand end is d1 which is larger than d2 (d1>d2). That is, the concave lens is formed into a single-side concave lens.

According to the third embodiment, the length of the optical path for light allowed to pass through the optical portion 24 is elongated in a direction from the left end to the right end of the optical portion 24. As a result, the display surface is deformed. As a result, the image 30 is formed which is formed upward to the right as shown in FIG. 7(b). When a user frequently views switch on the liquid-crystal display 16 from a right or left position as a substitute for viewing from the front position, the display can be tilted to the main user (the driver). As a result, easy handling is permitted.

Therefore, a satisfactory effect can be obtained when the electric device A for a vehicle according to this embodiment is disposed in the central portion of the vehicle so as to be viewed from right and left positions. The structure according to this embodiment is formed to be adaptable to a left-hand drive car. When the direction of the single-side concave lens of the optical portion 24 is inverted, a structure suitable to the right-handle car can be formed.

As shown in FIGS. 6(a) and 6(b), the left-hand outer portion of the switch structure for a display screen is formed into the other-information display area of the liquid-crystal display 16. An inclined surface 31 of the face cover 15 for supporting the end of the optical portion 24 is formed to be suitable to the angle of the line of sight of the user. In the foregoing case, the third embodiment shown in FIG. 6(b) has the structure that the thickness of the left end of the optical portion 24 is small. When a comparison is made with the second embodiment, an advantage can be obtained in that the dead space on the display screen 16a caused from the face cover 15 can be reduced by a.

Figure 8:
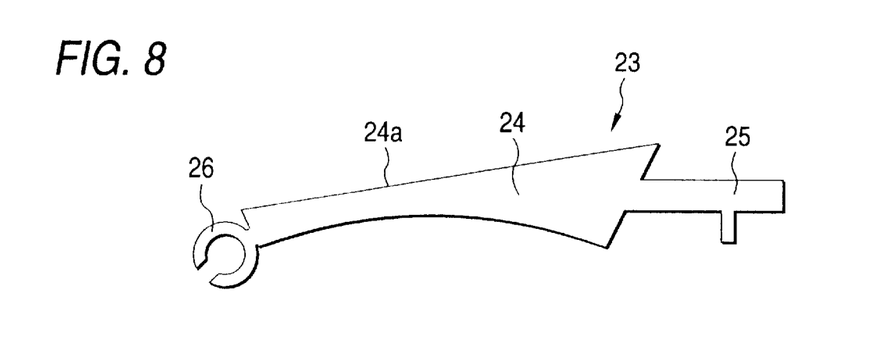
FIG. 8 is a side view showing a transparent operation plate 23 according to a fourth embodiment of the present invention.

FIG. 8 is a side view showing a transparent operation plate 23 according to a fourth embodiment of the present invention. Referring to FIG. 8, the fourth embodiment has a structure similar to the first embodiment such that the optical portion 24 includes a concave lens having a flat surface on the surface side 24a and a concave shape on the other side facing the display screen 16a. The flat surface of the surface side 24a is inclined such that the left-hand portion is lowered and the right-hand portion is raised. The concave lens is structured such that the thickness of the left-hand portion is made to be smaller and that of the right-hand portion is made to be larger with respect to the thickness of the central portion. Thus, a single-side concave lens is employed.

That is, the fourth embodiment has the structure obtained by turning the structure according to the third embodiment inside out. Similarly to the third embodiment, the optical portion 24 forms the image 30 of the display surface raised to the right. Similarly to the first embodiment, the surface side 24a of the optical portion 24 is formed into the flat surface. Moreover, the other side facing the display screen 16a is formed into the concave shape. Therefore, the side which is depressed by the user is the flat surface. Moreover, the surface side 24a is inclined toward the user. Therefore, furthermore easy handling is permitted.

Figure 9:
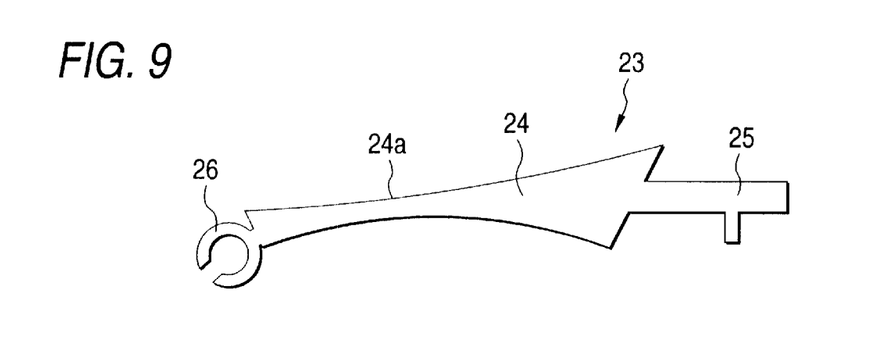
FIG. 9 is a side view showing a transparent operation plate 23 according to a fifth embodiment of the present invention.

FIG. 9 is a side view showing a transparent operation plate 23 according to a fifth embodiment of the present invention. Referring to FIG. 9, the fifth embodiment has a structure that the optical portion 24 includes a concave lens having a concave shape on the surface side 24a and a concave shape on the other side facing the display screen 16a. Similarly to the fourth embodiment, the surface side 24a of the optical portion 24 is inclined such that the left-hand portion is made to be low and the right-hand portion is made to be high. Moreover, the concave lens is structured such that the thickness of the left-hand portion is small and that of the right-hand portion is large as compared with the thickness of the central portion. Thus, a single-side concave lens is employed. Therefore, similar effects to those obtainable from the fourth embodiment can be obtained.

Since the fifth embodiment has the structure that the two sides of the optical portion 24 are formed into the concave shapes, the ratio of the effective display area of the liquid crystal display with respect to the area of opening of the transparent operation plate can furthermore be raised. As a result, a wide angle of visibility can be maintained. Moreover, the display area of the liquid crystal display can furthermore effectively be used.

Figure 10:
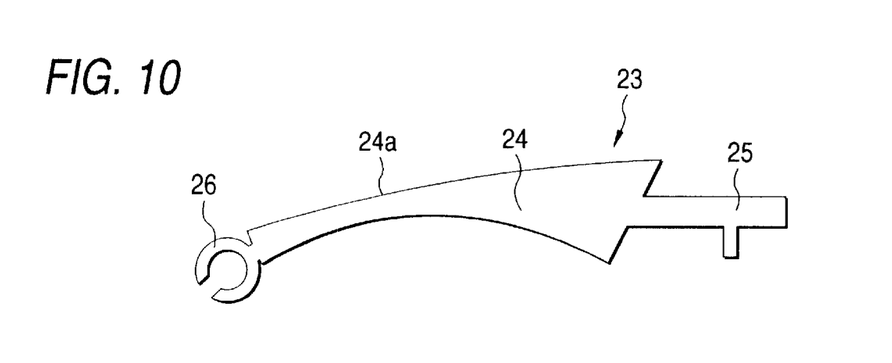
FIG. 10 is a side view showing a transparent operation plate 23 according to a sixth embodiment of the present invention.

FIG. 10 is a side view showing a transparent operation plate 23 according to a sixth embodiment of the present invention. Referring to FIG. 10, the sixth embodiment has the structure that the optical portion 24 has a convex shape on the surface side 24a thereof and a concave shape on the other side facing the display screen 16a. The radius of curvature of the convex shape is made to be larger than that of the concave shape. Similarly to the fourth embodiment, the surface side 24a of the optical portion 24 is inclined such that the left-hand portion is made to be low and the right-hand portion is made to be high. The thickness of the concave lens is made such that the thickness of the left-hand is small and that of the right-hand portion is large with respect to the thickness of the central portion. Thus, a single-side concave lens is employed. Therefore, similar effects to those obtainable from the fourth embodiment can be obtained. Since the sixth embodiment has the structure that the optical portion 24 has the convex shape and the concave shape with which the directions of deformation of the image are made to be different from each other, the aberration of the lens can easily be corrected. As a result, an image free from any deformation can be obtained.

Figures 11A, 11B:
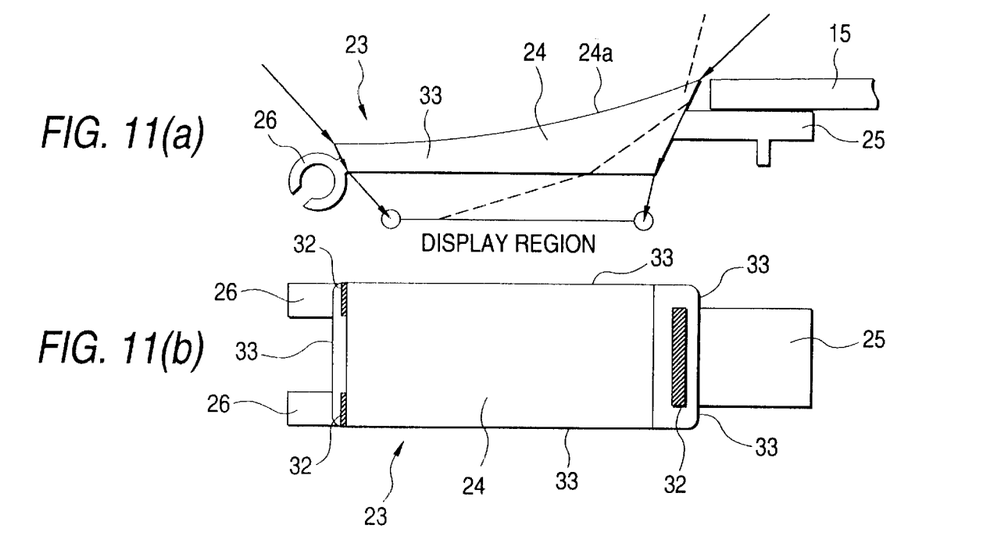
FIG. 11(a) is a side view showing the transparent operation plate 23 in a case where the overall body of the transparent operation plate 23 is formed of a transparent member and FIG. 11(b) is a plan view of the transparent operation plate 23.

FIG. 11(a) is a side view showing a transparent operation plate 23 in a case where the overall body of the transparent operation plate 23 is made of a transparent member. FIG. 11(b) is a plan view of the transparent operation plate 23. Referring to FIGS. 11(a) and 11(b), connecting end surfaces 32 (faint black portions shown in FIG. 11(b)) between the optical portion 24 and the switch depressing portion 25 and between the optical portion 24 and the pivotally supporting portion 26 have a high reflectivity. Moreover, an outer end surface 33 of the optical portion 24 which is made contact with air has a high reflectivity. Therefore, light beams among light beams made incident on the optical portion 24 which are deviated from a predetermined optical axis and which pass through optical paths toward the connecting end surface 32 and the outer end surface 33 are reflected by the end surfaces 32 and 33. As a result, reflected light causes a ghost to occur. A seventh embodiment is arranged to prevent the ghost.

Figures 12A, 12B:
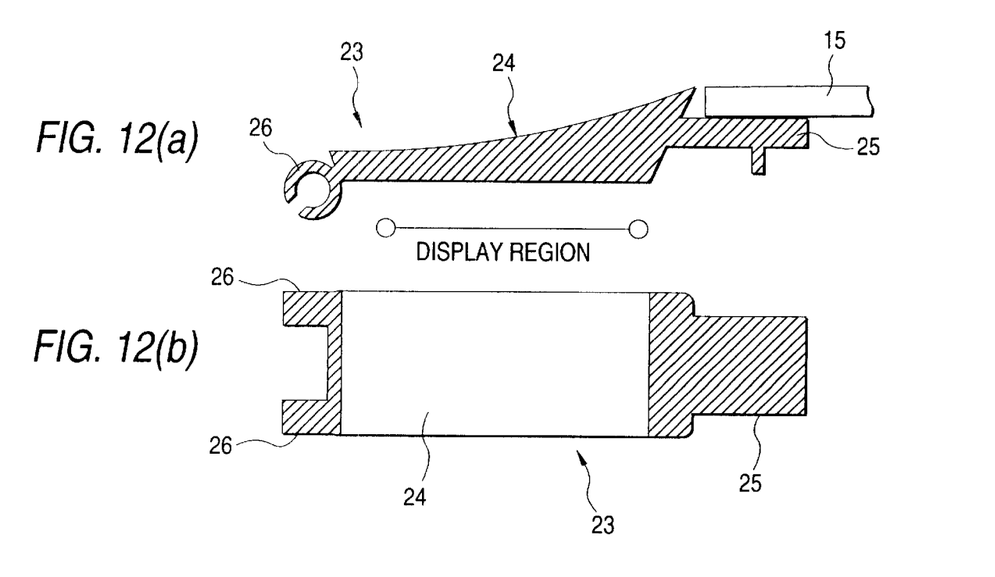
FIG. 12(a) is a side view showing a transparent operation plate 23 according to a seventh embodiment of the present invention and FIG. 12(b) is a plan view showing the transparent operation plate 23.

FIG. 12(a) is a side view showing a transparent operation plate 23 according to the seventh embodiment. FIG. 12(b) is a plan view of the transparent operation plate 23. Referring to FIGS. 12(a) and 12(b), the seventh embodiment has a structure that substantially the overall portion of an optical portion 24 of the transparent operation plate 23 is formed of a transparent acrylic-resin plate. The switch depressing portion 25 and the pivotally supporting portion 26 is formed of a black acrylic-resin material (faint black portions shown in FIGS. 12(a) and 12(b)) which is a light absorbing material.

A portion of the optical portion 24 which is not formed of the transparent acrylic-resin material is an outer end surface portion of the outer end surface of the optical portion 24 which is made contact with air except for the surface side 24a and the reverse side (the other side facing the display screen). The foregoing portion is formed of a black acrylic-resin material (faint black portions shown in FIGS. 12(a) and 12(b)). That is, the transparent operation plate 23 has two color sections realized by the transparent acrylic-resin material and the black acrylic-resin material. Thus, any interface serving as the light reflecting surface is not formed.

In the seventh embodiment, light beams among light beams made incident on the optical portion 24 which are deviated from a predetermined optical axis and which pass through the optical paths toward the connecting end surface 32 and the outer end surface 33 are not reflected by the end surfaces 32 and 33. Therefore, occurrence of a ghost can be prevented.

The seventh embodiment is structured such that the transparent member is formed of the transparent acrylic-resin material and the light absorbing member is formed of the black acrylic-resin material. Note that the present invention is not limited to the foregoing structure. For example, the peripheral portion of the transparent member formed of the transparent acrylic-resin material may be coated with a mat black coating material to form the light absorbing portion.

Figure 13:
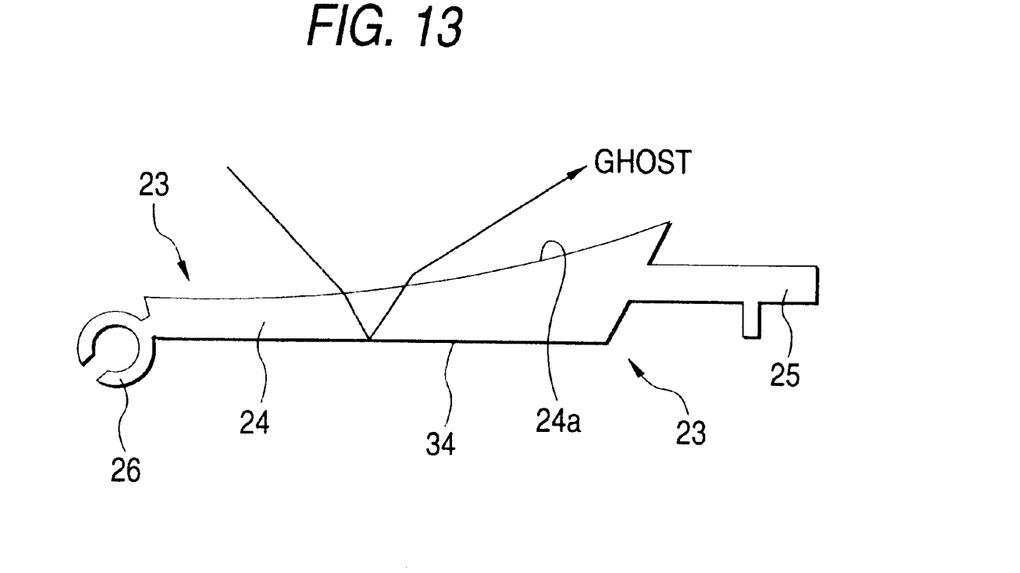
FIG. 13 is a side view showing a transparent operation plate 23 according to an eighth embodiment of the present invention.

FIG. 13 is a side view showing a transparent operation plate 23 according to an eighth embodiment of the present invention. Referring to FIG. 13, the eighth embodiment has a structure that the optical portion 24 facing the display screen 16a is provided with a non-reflecting portion (for example, AR-coating) 34 for preventing reflection of incident light.

If the non-reflecting portion 34 is not provided, light made incident on the optical portion 24 is sometimes reflected by the lower surface of the optical portion 24. Reflected light causes overlap with the display of the display screen to occur, causing the contrast of the display to be lowered. If the afternoon sun or intense light exists, the contrast is excessively lowered. However, the provision of the non-reflecting portion 34 is able to prevent reflected light. As a result, lowering of the contrast can be prevented. Therefore, deterioration in the display quality can be prevented.

Figure 14:
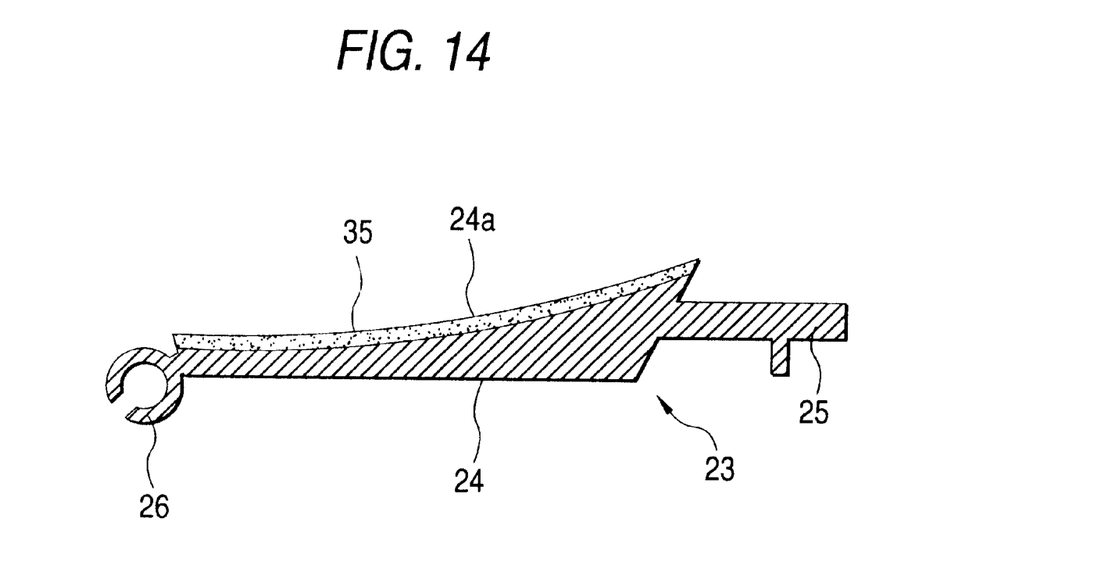
FIG. 14 is a side view showing a transparent operation plate 23 according to a ninth embodiment of the present invention.

FIG. 14 is a side view showing a transparent operation plate 23 according to a ninth embodiment of the present invention. Referring to FIG. 14, the ninth embodiment has a structure that the surface side 24a of the optical portion 24 is provided with a smoke layer 35. The smoke layer 35 has a uniform thickness regardless of change in the thickness of the optical portion 24. Similarly to the seventh embodiment, the transparent operation plate 23 has two color portions realized by the transparent acrylic-resin material and the black acrylic-resin material.

Since the ninth embodiment is Provided with the smoke layer 35, the contrast can be raised when electric power has been supplied to the liquid-crystal display 16. When the supply of electric power to the liquid-crystal display 16 is interrupted, the smoke effect improves the appearance of the display screen 16a. As a result, the display quality can be improved. Moreover, the black acrylic-resin material is able to prevent occurrence of any ghost. Therefore, the contrast can be raised.

The smoke layer 35 has the uniform thickness regardless of change in the thickness of the optical portion 24. The reason for this will now be described. If the overall body of the optical portion 24 is formed of the smoke material, the thickness of the smoke layer varies. Thus, the transmittance varies, causing the display quality to deteriorate. Thus, the deterioration can be prevented.

Figure 15A:
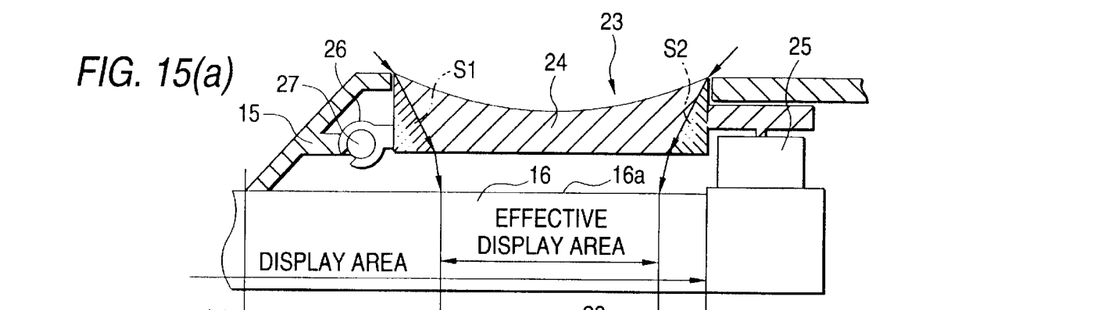
FIG. 15(a) is a cross sectional view showing a switch structure for a display screen according to a tenth embodiment.

FIG. 15(a) is a cross sectional view showing a switch structure for a display screen according to a tenth embodiment. Referring to FIG. 15(a), the tenth embodiment has the structure that the optical portion 24 has the surface side 24a formed into the concave shape and the display screen 16a formed into the flat concave lens. That is, the tenth embodiment has a structure obtained by turning the optical portion 24 according to the first embodiment inside out. The other structures are similar to those according to the first embodiment. Therefore, similar effects to those obtainable from the first embodiment can be obtained.

Figure 15B:
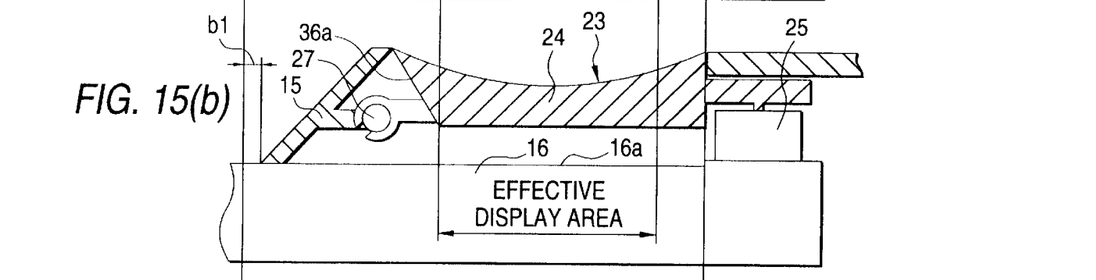
FIG. 15(b) is a cross sectional view showing a switch structure for a display screen according to a first modification of the tenth embodiment.

FIG. 15(b) is a cross sectional view showing a switch structure for a display screen according to a first modification of the tenth embodiment. Referring to FIG. 15(b), the first modification has a structure that light made incident on the left-hand limit surface for a required angle of visibility passes through an optical path formed into the optical portion 24 and determines the left-hand end surface 36a of the optical portion 24. Moreover, a pivotally supporting portion 26 is connected to the end surface 36a. That is, a shape obtained by cutting region S1 indicated with an imaginary-line hatching shown in FIG. 15(a) is formed. As a result, the width of the transparent operation plate 23 can be reduced. As compared with the structure shown in FIG. 15(a), the size of the switch structure for a display screen can be reduced by b1, as shown in FIG. 15(b).

Figure 15C:
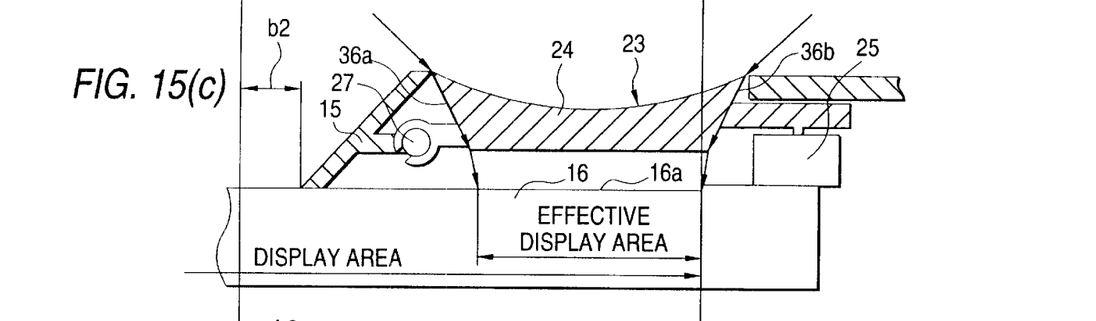
FIG. 15(c) is a cross sectional view showing a switch structure for a display screen according to a second modification of the tenth embodiment and FIG. 15(d) is a cross sectional view showing a switch structure for a display screen according to a third modification of the tenth embodiment.

FIG. 15(c) is a cross sectional view showing a switch structure for a display screen according to a second modification of the tenth embodiment. Referring to FIG. 15(c), the second modification has a structure in addition to the structure according to the first modification. That is, light made incident on the right-hand limit surface for a required angle of visibility passes through the optical path formed in the optical portion 24 and determines the right-hand end surface 36b of the optical portion 24. Moreover, the switch depressing portion 25 is connected to the end surface 36b.

That is, region S2 indicated with an imaginary-line hatching portion shown in FIG. 15(a) is omitted. As a result, the width of the transparent operation plate 23 can furthermore be reduced. As compared with the structure shown in FIG. 15(a), the size of the switch structure for a display screen can be reduced by b2, as shown in FIG. 15(c).

Figure 15D:
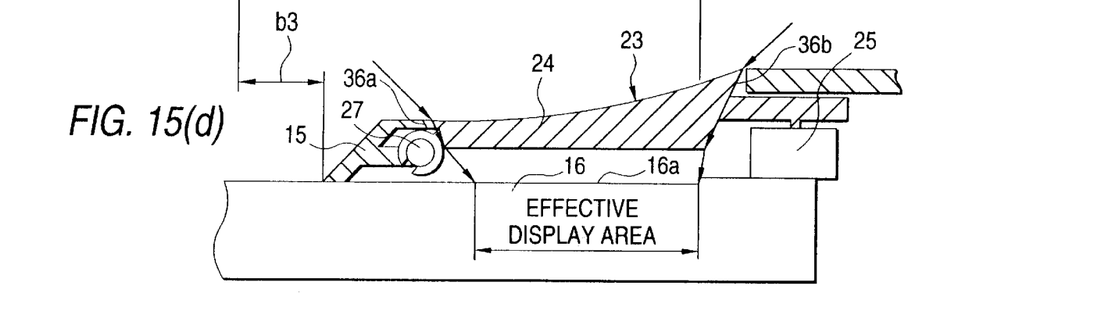

FIG. 15(d) is a cross sectional view showing a switch structure for a display screen according to a third embodiment of the tenth embodiment. Referring to FIG. 15(d), the third modification has a structure realized by adding a structure to the second modification. The optical portion 24 according to the third embodiment shown in FIG. 6(b) is employed in this modification. The third modification has the structure that the thickness of the left-hand end of the optical portion 24 is reduced. Therefore, the width of the face cover 15 can be reduced. As a result, the size of the switch structure for a display screen can be reduced by b3 as shown in FIG. 15(d) as compared with the structure shown in FIG. 15(a).

Moreover, in this embodiment, a portion of the display screen 16a of the liquid-crystal display 16 is assigned to the image of switch information. In addition, the image of switch information is combined with the switch portions 20 and 21. The thus-constructed switch structure for a display screen is permitted to have a large other-information display area except for switch information.

Although each of the foregoing embodiment has the structure that the display device is the liquid-crystal display 16. The display device may, for example, be a cathode ray tube which is required to be capable of displaying various information on its display screen as images.

In each of the embodiments, the optical portion 24 includes the concave lens. The optical portion 24 may include an element except for the concave lens. The element is able to form the image of the display screen 16a in such a manner that the range in which the image of switch information is made to be visible.

In each of the embodiments, the portion of the display screen 16a of the liquid-crystal display 16 is assigned to the switch-information area to form the switch structure for a display screen. As a matter of course, a display device for only displaying an image of switch information may be employed to form the switch structure for a display screen.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A switch structure for a display screen, comprising:
   a display device that includes a display screen and is capable of displaying on the display screen an image that indicates various information comprising switch information and wherein the display screen comprises an effective display area corresponding to an area over which the image is visible;
   a switch body disposed on the display device, the switch body being operative to be switched in one of an on state and an off state thereof; and an operation plate disposed in front of the display screen of the display device, wherein when the operation plate is depressed, the state of the switch body is switched, the operation plate including an optical portion through which an image indicating the switch information on the effective display area of the display screen is transmitted, the optical portion being shaped to increase the effective display area.

2. The switch structure of claim 1, wherein the optical portion of the operation plate has a concave lens.

3. The switch structure of claim 1, wherein the operation plate further includes:

a switch depressing portion formed on one end of the optical portion, the switch depressing portion being disposed in front of the switch body, and a pivotally supporting portion provided adjacent to the other end of the optical portion, wherein the optical portion is pivotally supported by the pivotally supporting portion, and wherein when the optical portion is depressed, the state of the switch body is switched by the switch depressing portion.

4. The switch structure of claim 2, wherein the concave lens has a flat surface on one side thereof and a concave shape on an opposite side thereof facing the display screen.

5. The switch structure of claim 2, wherein the concave lens has a concave shape on one side thereof and also a concave shape on an opposite side thereof facing the display screen.

6. The switch structure of claim 2, wherein the concave lens has a convex shape on one side thereof and a concave shape on an opposite side thereof facing the display screen.

7. The switch structure of claim 3, wherein the operation plate has a structure that only the optical portion is formed of a transparent member, and the switch depressing portion and the pivotally supporting portion are formed of a light absorbing member.

8. The switch structure of claim 1, wherein the optical portion is provided with a non-reflection portion for preventing reflection of incident light, the non-reflection portion facing the display screen.

9. The switch structure of claim 1, wherein the optical portion has a surface provided with a smoke layer.

10. The switch structure according to any one of claims 1 to 9, further comprising a switch portion that includes the switch body and the operation plate, wherein the display screen of the display device has a switch-information display area on which the image indicating the switch information is displayed and the other-information display area on which the other information is displayed, so that at least two kinds of information are displayed on the display screen, and the switch portion is disposed above the switch-information display area of the display screen.

* * * * *